US009020913B2

(12) United States Patent
Rajamani et al.

(10) Patent No.: US 9,020,913 B2
(45) Date of Patent: Apr. 28, 2015

(54) REAL-TIME INTERACTIVE AUTHORIZATION FOR ENTERPRISE SEARCH

(75) Inventors: Nithya Rajamani, Shrub Oak, NY (US); James Rubas, Yorktown Heights, NY (US); Norbert G. Vogl, Mahopac, NY (US); Wlodek Wlodzimierz Zadrozny, Tarrytown, NY (US)

(73) Assignee: International Business Machines Corporation, Armonk, NY (US)

(*) Notice: Subject to any disclaimer, the term of this patent is extended or adjusted under 35 U.S.C. 154(b) by 1615 days.

(21) Appl. No.: 11/924,219

(22) Filed: Oct. 25, 2007

(65) Prior Publication Data

US 2009/0112868 A1   Apr. 30, 2009

(51) Int. Cl.
G06F 7/00 (2006.01)
G06F 17/30 (2006.01)
G06F 21/60 (2013.01)
G06F 21/62 (2013.01)

(52) U.S. Cl.
CPC ........ G06F 21/604 (2013.01); G06F 17/30867 (2013.01); G06F 21/6218 (2013.01)

(58) Field of Classification Search
CPC ................ G06F 21/60; G06F 21/6209; G06F 17/30522; H04L 63/0435; H04L 63/0815; H04L 63/083; H04L 67/125; H04L 67/36; G06Q 20/3829; G06Q 30/0214
See application file for complete search history.

(56) References Cited

U.S. PATENT DOCUMENTS

| | | | |
|---|---|---|---|
| 5,109,413 A | | 4/1992 | Comerford et al. |
| 5,552,897 A | * | 9/1996 | Mandelbaum et al. ....... 358/400 |
| 5,802,518 A | | 9/1998 | Karaev et al. |
| 5,826,265 A | | 10/1998 | Van Huben et al. |
| 5,845,067 A | | 12/1998 | Porter et al. |
| 5,850,442 A | | 12/1998 | Muftic |
| 5,887,140 A | * | 3/1999 | Itsumi et al. .................. 709/225 |
| 6,044,378 A | | 3/2000 | Gladney |
| 6,070,171 A | | 5/2000 | Snyder et al. |
| 6,201,790 B1 | | 3/2001 | Teboul |
| 6,389,541 B1 | | 5/2002 | Patterson |
| 6,401,091 B1 | | 6/2002 | Butler et al. |
| 6,728,733 B2 | | 4/2004 | Tokui |
| 6,826,692 B1 | | 11/2004 | White |
| 6,829,593 B1 | | 12/2004 | Ritter et al. |
| 6,859,806 B1 | | 2/2005 | Kamarei et al. |
| 6,901,401 B2 | | 5/2005 | Bangel et al. |

(Continued)

FOREIGN PATENT DOCUMENTS

EP   1014249 A1   6/2000
EP   1014249 B1   3/2004

(Continued)

*Primary Examiner* — Augustine K Obisesan
(74) *Attorney, Agent, or Firm* — Anne V. Dougherty; Ryan, Mason & Lewis, LLP (57) ABSTRACT

Techniques for providing at least one user access to one or more documents in a collaborative computing environment in accordance with a search engine are provided. The user is presented with search results, wherein the search results comprise at least one document comprising at least one portion to which the user has no access. A request from the user for access to the at least one document is received. A supervising entity is then notified of the user request to access the at least one document. An instruction from the supervising entity is then received. In accordance with the received instruction, the user is granted access to the at least one document.

29 Claims, 7 Drawing Sheets

(56) References Cited

U.S. PATENT DOCUMENTS

| | | |
|---|---|---|
| 6,970,869 B1 | 11/2005 | Slaughter et al. |
| 6,988,199 B2 | 1/2006 | Toh et al. |
| 7,024,391 B2 | 4/2006 | Burich |
| 7,028,180 B1 | 4/2006 | Aull et al. |
| 7,051,036 B2 | 5/2006 | Rosnow et al. |
| 7,080,076 B1 | 7/2006 | Williamson et al. |
| 7,152,139 B1 | 12/2006 | Barrett |
| 7,188,150 B2 | 3/2007 | Grueneberg et al. |
| 2001/0029510 A1 | 10/2001 | Tokui |
| 2001/0056421 A1* | 12/2001 | Tada et al. ............... 707/9 |
| 2002/0069175 A1 | 6/2002 | Burich |
| 2002/0128954 A1 | 9/2002 | Evans |
| 2003/0000969 A1 | 1/2003 | Mie |
| 2003/0009691 A1 | 1/2003 | Lyons et al. |
| 2003/0014384 A1 | 1/2003 | Ewald et al. |
| 2003/0037251 A1 | 2/2003 | Frieder et al. |
| 2003/0039944 A1 | 2/2003 | Grueneberg et al. |
| 2003/0187846 A1 | 10/2003 | Bangel et al. |
| 2004/0064824 A1* | 4/2004 | McNeely et al. ......... 719/316 |
| 2004/0068462 A1 | 4/2004 | Katz et al. |
| 2004/0098382 A1 | 5/2004 | Chuang et al. |
| 2004/0122811 A1 | 6/2004 | Page |
| 2004/0213437 A1 | 10/2004 | Howard et al. |
| 2005/0024674 A1 | 2/2005 | Fujishige et al. |
| 2005/0131915 A1 | 6/2005 | Hicks et al. |
| 2005/0144452 A1 | 6/2005 | Lynch et al. |
| 2005/0216468 A1* | 9/2005 | Fujiwara et al. ............ 707/9 |
| 2006/0004749 A1* | 1/2006 | Dettinger et al. ........... 707/6 |
| 2006/0053097 A1 | 3/2006 | King et al. |
| 2006/0053105 A1 | 3/2006 | Sanchez |
| 2006/0080316 A1 | 4/2006 | Gilmore et al. |
| 2006/0129809 A1* | 6/2006 | Battagin et al. ............ 713/166 |
| 2006/0184997 A1 | 8/2006 | La Rotonda et al. |
| 2006/0253449 A1 | 11/2006 | Williamson et al. |
| 2006/0272027 A1* | 11/2006 | Noble ..................... 726/27 |
| 2007/0056034 A1* | 3/2007 | Fernstrom ............... 726/20 |
| 2007/0143123 A1 | 6/2007 | Goldberg et al. |
| 2007/0162417 A1* | 7/2007 | Cozianu et al. ............ 707/1 |
| 2007/0244867 A1 | 10/2007 | Malandain et al. |

FOREIGN PATENT DOCUMENTS

| | | |
|---|---|---|
| JP | 2000285174 A | 10/2000 |
| JP | 2001273300 A | 10/2001 |
| JP | 2003016068 A | 1/2003 |
| JP | 2003108796 A | 4/2003 |
| JP | 2004110664 A | 4/2004 |
| JP | 2004178498 A | 6/2004 |
| WO | WO 0201271 A1 * | 1/2002 |
| WO | WO0245316 | 6/2002 |
| WO | WO 2006058387 A1 * | 6/2006 |

* cited by examiner

FIG. 8
800 ly, techniques for obtaining, through a search engine, real-time grants of access from a supervising entity to one or more documents in which the user has limited access.

REAL-TIME INTERACTIVE AUTHORIZATION FOR ENTERPRISE SEARCH

FIELD OF THE INVENTION

The present invention relates to providing user access to one or more documents in a collaborative computing environment through a search engine and, more particularly, to techniques for obtaining real-time grants of access from a supervising entity to one or more documents in which the user has limited access.

BACKGROUND OF THE INVENTION

Technology has undoubtedly increased our efficiency in sharing information. However, there continues to be a growing need for faster and unencumbered access to shared information. This is especially true when users want access to information, but the users lack the requisite permissions for access. This situation can be illustrated in a business scenario. In a business setting, groups of people may know of or may assume the existence of documents when conducting business transactions, but each group possesses a different level of access to these documents. For example, when planning a business deal, a person may want all documentation related to the business deal. This documentation may include prior e-mails, letters, portable document files (PDFs), etc. Ideally, it would be advantageous for the person to: (a) know about the existence of these documents and (b) have access to view the contents of these documents.

Currently, users can search for documents using commercially available search engines. However, none of the currently available search engines efficiently accommodate the situation illustrated above. First, current search engines do not allow users to search for documents to which the users have no access. Therefore, a user can not request access to these documents because the user fails to know of their existence. Currently, there is no search engine that allows users to search document collections of various access levels.

Second, even if a user were to find a document of interest in which the user has limited access, the user can not quickly and efficiently obtain access to the document. Today, if a user wanted access to a restricted document, the user must first find out who can grant permission to view the document. Next, the user must find contact information of the entity that can grant permission. After finding contact information, the user must then contact the entity via phone, e-mail, or other communications device, and convince the entity to grant permission. Even if the user is successful in obtaining permission to access the document the user must then wait until the entity sends the document to the user or includes the user on an access list. This entire process is both time consuming and inefficient. Currently, no search engine provides a user the ability to search for documents of varying access levels. Furthermore, no search engine provides users and entities the ability to interact in real-time for access to restricted documents.

Therefore, there is a need for a system that allows a user to search for restricted documents and allows a user to obtain quick, real-time access to inaccessible documents.

SUMMARY OF THE INVENTION

Principles of the present invention provide techniques for providing at least one user access to one or more documents in a collaborative computing environment and, more particularly, techniques for obtaining, through a search engine, real-time grants of access from a supervising entity to one or more documents in which the user has limited access.

In accordance with one aspect of the invention, a computer-based technique for providing at least one user access to one or more documents in a collaborative computing environment in accordance with a search engine is provided. A user is presented with search results, wherein the search results comprise at least one document comprising at least one portion to which the user has no access. A request from the user for access to the at least one document is received. A supervising entity is then notified of the user request to access the at least one document. An instruction from the supervising entity is then received. In accordance with the received instruction, the user is granted access to the at least one document.

In an additional embodiment, the one or more documents which are presented to the user in the search results may be selected in accordance with at least one of identity of the user, a policy of the collaborative system, and an access control list. Further, the supervising entity may increase or decrease user access to one or more documents via the search engine. Also, the search engine may track at least one of user access to the one or more documents, grants of access to the one or more documents, and levels of access to the one or more documents.

In accordance with another aspect of the invention, a computer-based method provides for a user obtaining access to one or more documents in a collaborative computing environment using a search engine. The user searches for one or more documents, wherein the search engine provides search results comprising at least one document, the at least one document comprising at least one portion to which the user has no access. The user then requests access to the at least one document using the search engine, wherein the search engine notifies a supervising entity of the request. In accordance with an instruction from the supervising entity, the user receives access to the at least one document through the search engine.

In accordance with another aspect of the invention, a computer-based method provides for a supervising entity granting user access to one or more documents in a collaborative computing environment using a search engine. The supervising entity indexes the one or more documents using the search engine, wherein at least one of the one or more documents comprises at least one portion to which the user has no access. The supervising entity then receives notification from the search engine of any user request to access the at least one document. The supervising entity then instructs the search engine to provide the user with access to the at least one document.

In accordance with another aspect of the invention, an apparatus for providing at least one user access to one or more documents in a collaborative computing environment in accordance with a search engine, which includes memory and at least one processor coupled to the memory. The processor is operative to present the user with search results, wherein the search results comprise at least one document comprising at least one portion to which the user has no access. If the user wants access to a particular document, the processor is further operative to receive a request from the user for access to the at least one document. After receiving a request for access, the processor is further operative to notify a supervising entity of the user request to access the at least one document, receive an instruction from the supervising entity with regard to the request, and grant access to the user to the at least one document in accordance with the received instruction.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

As will be illustrated in detail below, principles of the present invention provide techniques for providing at least one user access to one or more documents in a collaborative computing environment in accordance with a search engine. More specifically, an embodiment of the present invention includes techniques for granting access to the user to at least one document comprising at least one portion to which the user has no access in accordance with an instruction from a supervising entity. The principles of the present invention will be illustrated herein in conjunction with an exemplary technique for providing at least one user access to one or more documents in a collaborative computing environment using a search engine.

The term "enterprise" as used herein is intended to be construed broadly so as to encompass, by way of example and without limitation, any organized group (e.g., a corporation, partnership, etc.).

The term "workflow" as used herein is intended to be construed broadly so as to encompass, by way of example and without limitation, any set of fixed instructions which are used to complete a process.

The term "collaborative computing environment" as used herein is intended to be construed broadly so as to encompass, by way of example and without limitation, any forum where multiple parties are in communication with each other due to a common interest (e.g., internet teleconference, virtual chat, e-mail, etc.)

The term "supervising entity" as used herein is intended to be construed broadly so as to encompass, by way of example and without limitation, any party that has the authority to grant a user access to a document, which may include, but is not limited to, an employer, administrator, manager, supervisor, or automated system.

The term "virtual repository" as used herein is intended to be construed broadly so as to encompass, by way of example and without limitation, any collection of pointers to documents, wherein the documents are stored at various locations.

A key challenge in providing user access to one or more documents in a collaborative computing environment in accordance with a search engine is streamlining the process for accessing documents of interest. First, conventional methods only allow users to see documents they have access to. Therefore, access-restricted documents are identified indirectly (e.g., word-of-mouth, reading related documents, guesswork, etc.). This is both time-consuming and resource draining. Second, even if a user locates a document of interest in which the user has limited access, conventional methods require users to exit the search environment and obtain access to those documents through other means. Constantly diverting attention from the original search affects the ability of a user to research quickly and efficiently. Therefore, a streamlined process of searching for restricted documents and obtaining access to those documents is needed.

Figure 1:
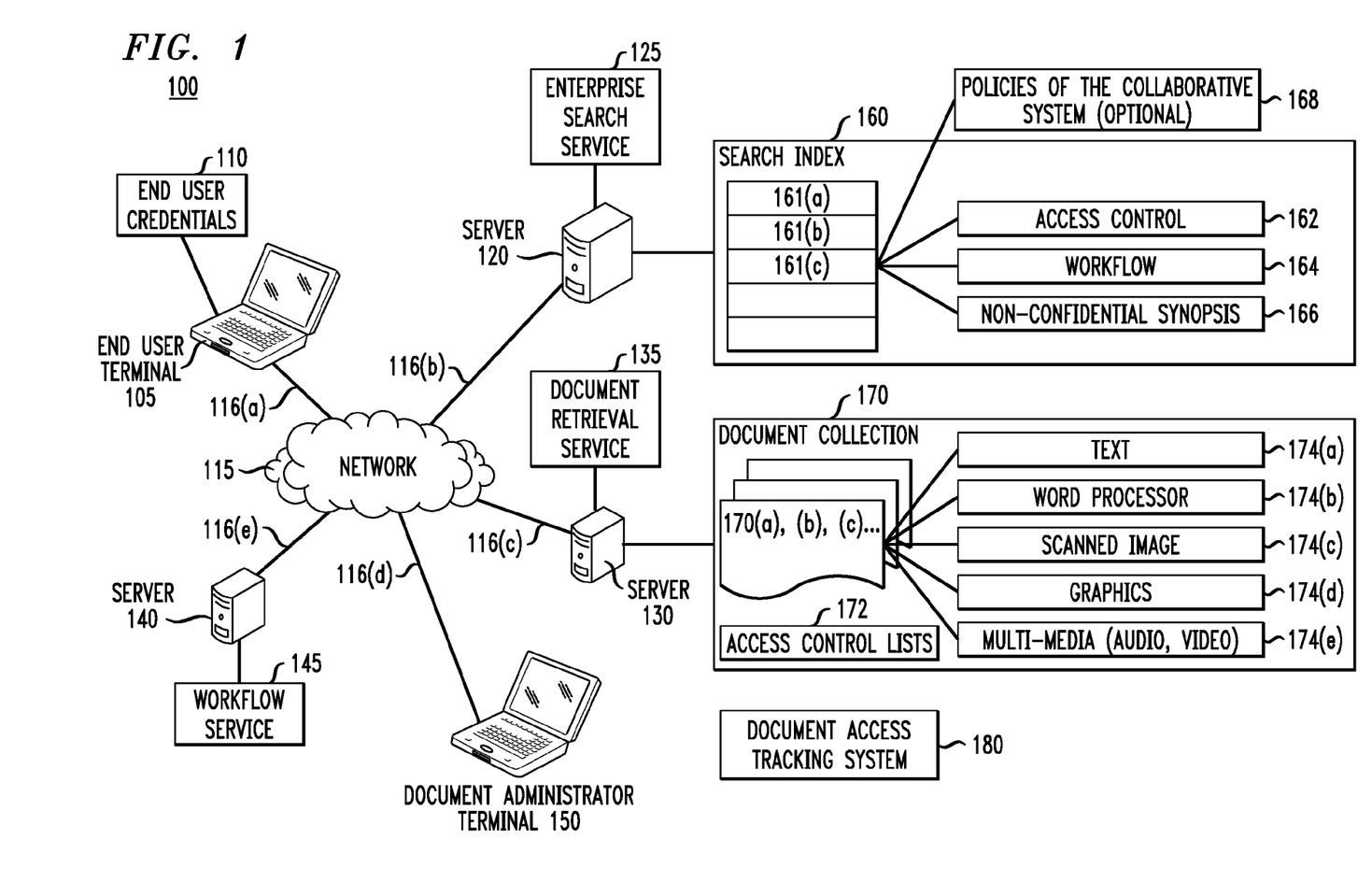
FIG. 1 is a diagram illustrating an example of a computer-based system for providing at least one user access to one or more documents in a collaborative computing environment in accordance with a search engine, according to an embodiment of the present invention.

Referring initially to FIG. 1, a diagram illustrates an example of a computer-based system for providing at least one user access to one or more documents in a collaborative computing environment in accordance with a search engine, according to an embodiment of the present invention. System 100 illustrates the principle components of an improved enterprise search system. In an illustrative embodiment, the enterprise search system is a collaborative computing environment composed of multiple users connected by a networked communications system. The end user terminal 105 is a network computing device from which an end user can initiate searches against an enterprise search server 120. In a preferred embodiment, the end user terminal is a laptop computer equipped with a wireless network interface which runs an internet browser (e.g., Microsoft Internet Explorer, Firefox, etc.). The preferred end user terminal is also capable of displaying text, graphics, and multimedia documents such as plain text files, Hypertext Markup Language (HTML) web pages, Microsoft Office rich-text documents, Adobe Acrobat files, bitmaps, and digital audio and video files. In alternate embodiments, the end user terminal is a hand-held device, e.g., a Personal Digital Assistant (PDA) or a cell phone. The end user terminal may also be a desktop computer or a cable-network set-top box.

One or more credentials 110 are used to identify the user operating the end user terminal. The credentials can contain a logon user-id, a digital certificate, a search history, an employee serial number, or other identifying information. The credentials may also directly contain, or indirectly reference, the job of an individual within an enterprise, the manager of the individual, department, work history, and assigned projects. The types and formats of credentials are well-known to practitioners of enterprise system management.

The end user terminal is connected 116(*a*) to a computer network 115. In a preferred embodiment, this network is an enterprise network using the well-known IP (Internet Protocol) infrastructure. In alternate preferred embodiments, the network is further comprised of satellite networks, public internet networks, wireless networks, additional private enterprise networks, Virtual Private Networks (VPNs), telephone networks, and/or cell phone networks, The network serves to allow digital communication between the end user terminal, the enterprise search server 120, the document server 130, the workflow server 140, and the document administrator terminal 150. In a preferred embodiment, the terminals 105 and 150, and servers 120, 130, 140 are simultaneously connected 116(a)-(e) to the network 115. In alternate embodiments, the devices 105, 120, 130, 140, and 150 may be temporarily disconnected from the network, e.g., they may poll the network by connecting and disconnecting at periodic intervals, or require an outside event such as a telephone call, fax, e-mail or instant message to initiate a connection to the network.

Server 120 is a computer which executes an Enterprise Search Service 125. This service allows an end user to search one or more document collections 170. In an illustrative embodiment, the documents 170(a)-(c) contained within the document collections are part of a virtual repository wherein the documents are stored at various locations across the network.

The IBM OmniFind Enterprise Edition is one such an enterprise search service. It allows searches to be conducted over document collections retrieved through server 130, which maintains secure intranets, corporate public websites, and information extraction applications. The Enterprise Search Service maintains one or more Search Indices 160 which indexes documents, e.g., 170(a), 170(b), 170(c), within the document collection. The search index comprises one or more index records 161(a), 161(b), and 161(c) which contain information about a specific document of the document collection. In one embodiment, the index records 161(a), 161(b), and 161(c) contain fields identifying access control 162, optional workflow 164, and an optional non-confidential synopsis 166 of a document. And optionally, policies of the collaborative system 168.

The access control field 162 enables the Enterprise Search Service to compare the credentials of an end user and determine if the end user is permitted to view a given document. In an illustrative embodiment, the Enterprise Search Service may also consider additional policies of the collaborative system 168 before permitting end users to view documents. For example, a policy of the enterprise may state that end users can not preview or access any personal e-mails of executive officers.

In a preferred embodiment, the access control field further enables the Enterprise Search Service to compare the credentials of an end user and determine if the end user is permitted to search within a given document. The access control field also conditionally enables search access within selective portions of a given document. For example, a policy of the enterprise may state that end users can not access the portion of a contract document which contains financial specifics, but end users may search within the terms of service portion of contracts. Another policy may state that end users may search through the full text of a publication but their preview and viewing access is limited to the abstract or bibliography sections of the publications. A policy may state that end users may not search within attachments to documents. Hence, policies may be used to limit or restrict access to one or more documents.

The workflow field 164 identifies one or more workflows. Each workflow describes a series of steps that may conditionally grant end users access to the associated document. An example workflow includes the steps of: composing a message containing the text of the search query inputted by the end user, the name of the document of interest, and the credentials of the end user; sending the message as an instant message to the administrator of the document collection; receiving instructions and approval from the administrator; and then amending the credentials of the end user to permit access to the document of interest. Workflows are interpreted and executed by a Workflow Server 140. It should be noted that the workflow incorporates administrator contact information which is referenced when sending messages to administrators.

The optional non-confidential synopsis field 166 contains a brief synopsis of the contents of a document. Furthermore, the synopsis may only contain segments of the document that the user has access to preview. In a preferred embodiment, the non-confidential synopsis of the document of interest is presented to the user at the end user terminal. Viewing a synopsis allows the end user to make the decision to initiate a workflow. In alternate embodiments, the non-confidential synopsis is generated automatically by the Enterprise Search Service after a search has been executed.

Server 130 is a computer which executes a Document Retrieval Service 135. The document retrieval service receives requests from the end user terminal and retrieves documents from a document collection. The retrieval is dependent upon the credentials of the end user and the access control lists 172 of the document collection. Examples of document retrieval services include: web servers, J2EE application servers, relational database systems, ftp servers, multimedia servers, and content management systems, such as the Lotus Domino Document Manager, and IBM Lotus Notes and Domino 8.

The document retrieval service retrieves documents from one or more document collections. The documents can be text files 174(a), documents from a word processor 174(b), scanned images (e.g., fax or bitmaps) 174(c), vector graphics files 174(d), and multi-media files 174(e) containing audio or video clips. Each document is associated with an access control list which identifies the necessary credentials required for retrieval.

The access control list will typically specify necessary credentials for read access and write access. The access control list may, optionally, specify necessary credentials to enable copying, printing, modifying or cutting and/or pasting of the document. It may specify a different, possibly broader, set of credentials necessary to search within the document. And the access control list may identify credentials for access to portions of the document. For instance, an access control list may allow access to certain cells or sheets within a Microsoft Excel spreadsheet. An access control list may allow search access to the lecture notes or transcripts of a video presentation but not necessarily allow playback of the video content.

In a preferred embodiment, the Enterprise Search Service 125 is notified and the access control 162 fields for the respective search index 160 are updated whenever an access control list 172 is changed. This allows the Enterprise Search Service to react to changes in access control lists in a timely manner. In an alternate embodiment, the Enterprise Search Service periodically polls the document collections to identify changes to documents or their access control lists.

In a preferred embodiment, one or more document administrators access the network through document administrator terminals and conditionally grant end users access to documents of their assigned document collections. In an alternate embodiment, the workflow does not require any approval by a document administrator; therefore, the document administrator terminal can be omitted from the system.

Server 140 is a computer which directs execution of the workflows. Workflow servers are well-known in the art. Production workflow servers may execute software such as IBM's MQ Workflow Server and Adobe's Workflow Server. Software for custom workflow servers may also be developed to meet unique workflow requirements.

In an alternate embodiment, servers 120, 130, and 140 may be combined into one physical computer. Furthermore, the servers may be distributed and/or clustered over multiple computers.

The document administrator terminal 150 is where supervising entities can receive end user requests for access, control access to documents, and track access to documents. In an illustrative embodiment, end user requests for access to specific documents are forwarded from the workflow server. Using the document administrator terminal, a supervising entity has the ability to modify the access control lists, to grant or remove types of access and to set access control policies. In one example, the supervising entity can approve or deny a request for access after considering user information and information about the requested document, which are both forwarded with the request for access. In addition, the supervising entity can control access to documents by providing varying levels of access to the end user. In an illustrative embodiment, the supervising entity may increase or decrease access to documents by unblocking or blocking, respectively, portions of the requested documents. Further, the supervising entity may set access time limits. The instruction to increase or decrease access is sent to the workflow server where the instruction is processed and implemented. The implementation of an instruction may include amending the credentials of an end user or creating redacted versions of the originally requested document.

In an additional illustrative embodiment, the supervising entity, via the document administrator terminal, can include or exclude documents from the document collections and include or exclude documents from the search index at any time. Also, at any time, the supervising entity can create varying levels of access to particular documents by blocking or unblocking portions of documents as described above.

In another illustrative embodiment, a document access tracking system 180 allows the supervising entity to track grants of access to one or more documents, user access to one or more documents, and levels of access to one or more documents via the document administrator terminal. The tracking data may be stored at either the enterprise search server, document retrieval server, or the workflow server. In an alternate embodiment, the tracking data may be mirrored across the entire collaborative system.

Figure 2:
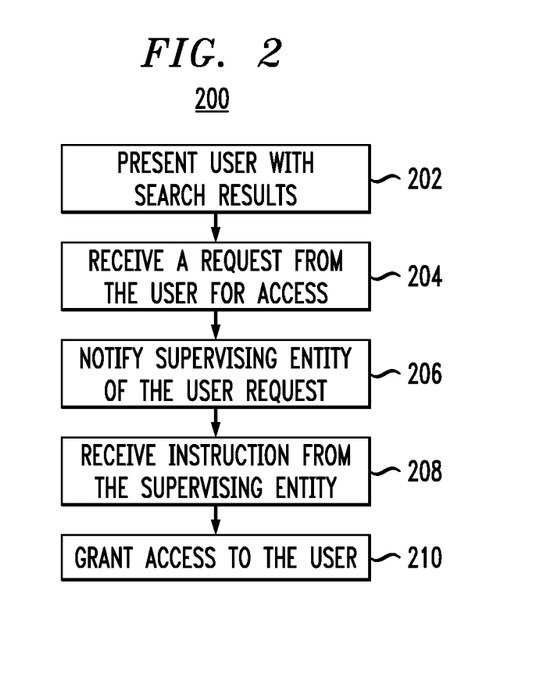
FIG. 2 is a flow diagram illustrating a methodology for a search engine providing at least one user access to one or more documents in a collaborative computing environment according to an embodiment of the present invention.

Referring now to FIG. 2, a flow diagram illustrates a methodology for a search engine providing at least one user access to one or more documents in a collaborative computing environment, according to an embodiment of the present invention. It should be appreciated that the steps of the following methodology are from the perspective of a search engine server that may be provided by an enterprise search service as described in FIG. 1. Methodology 200 begins at block 202 where the search engine presents the user with search results in response to a user query. If a document is inaccessible to the user, the search engine may receive a request from the user for access to the document 204. In response, the search engine notifies the supervising entity in charge of granting access to the specific document of the user request 206. The search engine then waits to receive an instruction from the supervising entity with regard to the user request 208. After receiving an instruction, the search engine may grant access to the user based on the instruction 210.

Figure 3:
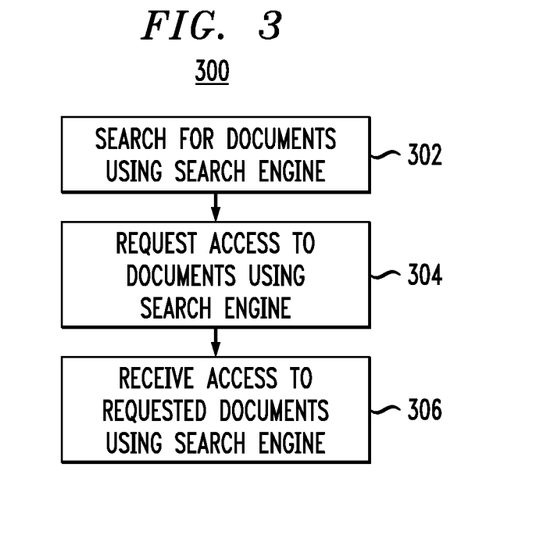
FIG. 3 is a flow diagram illustrating a methodology for a user obtaining access to one or more documents in a collaborative computing environment using a search engine, according to an embodiment of the present invention.

Referring now to FIG. 3, a flow diagram illustrates a methodology for a user obtaining access to one or more documents in a collaborative computing environment using a search engine, according to an embodiment of the present invention. It should be appreciated that the steps of the following methodology are from the perspective of an end user as described in FIG. 1. Methodology 300 begins at block 302 where the user searches for documents of interest with a search engine provided by the enterprise search system. After finding an inaccessible document of interest, the user can request access to the document via the search engine 304. The search engine processes the request and responds. If the request is approved, the user receives access to the requested document through the search engine 306.

Figure 4:
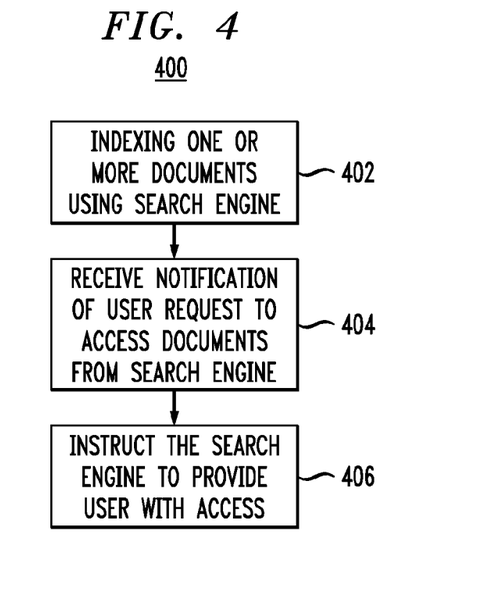
FIG. 4 is a flow diagram illustrating a methodology for a supervising entity granting a user access to one or more documents in a collaborative computing environment, according to an embodiment of the present invention.

Referring now to FIG. 4, a flow diagram illustrates a methodology for a supervising entity granting a user access to one or more documents in a collaborative computing environment, according to an embodiment of the present invention. It should be appreciated that the steps of the following methodology are from the perspective of a supervising entity as described in FIG. 1. Methodology 400 begins at block 402 where a supervising entity indexes one or more documents into a collaborative computing environment using a search engine. The supervising entity then receives notification of any user requests to access inaccessible documents 404. Depending on factors such as user credentials and sensitivity of the document, the supervising entity can instruct the search engine to provide varying levels of access 406.

Figure 5:
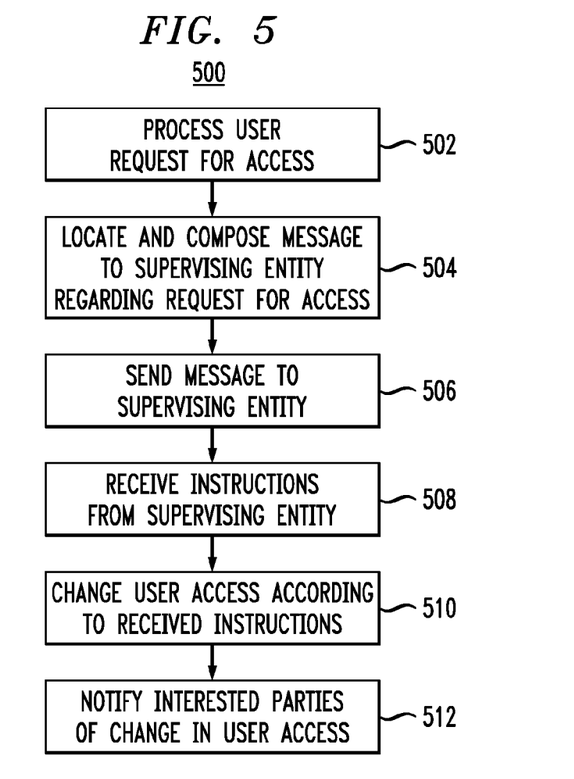
FIG. 5 is a flow diagram illustrating an example workflow, according to an embodiment of the present invention.

Referring now to FIG. 5, a flow diagram illustrates an example workflow, according to an embodiment of the present invention. Workflow 500 begins at block 502 where, after invoked, the workflow processes a user request for access. This includes, but is not limited to, obtaining query information, user information, and document information. After processing the request information, the workflow then locates and composes a message to the supervising entity in charge of granting access to the document of interest 504. This message is then sent to the supervising entity 506. After sending the message, the workflow waits to receive a response from the supervising entity 508. Any received instruction is processed and the workflow changes user access accordingly 510. After changes are made, the workflow notifies any parties that may be interested in the change of access 512. This may include the user who requested access, the supervising entity who granted access, and any additional supervising entities.

Figure 6:
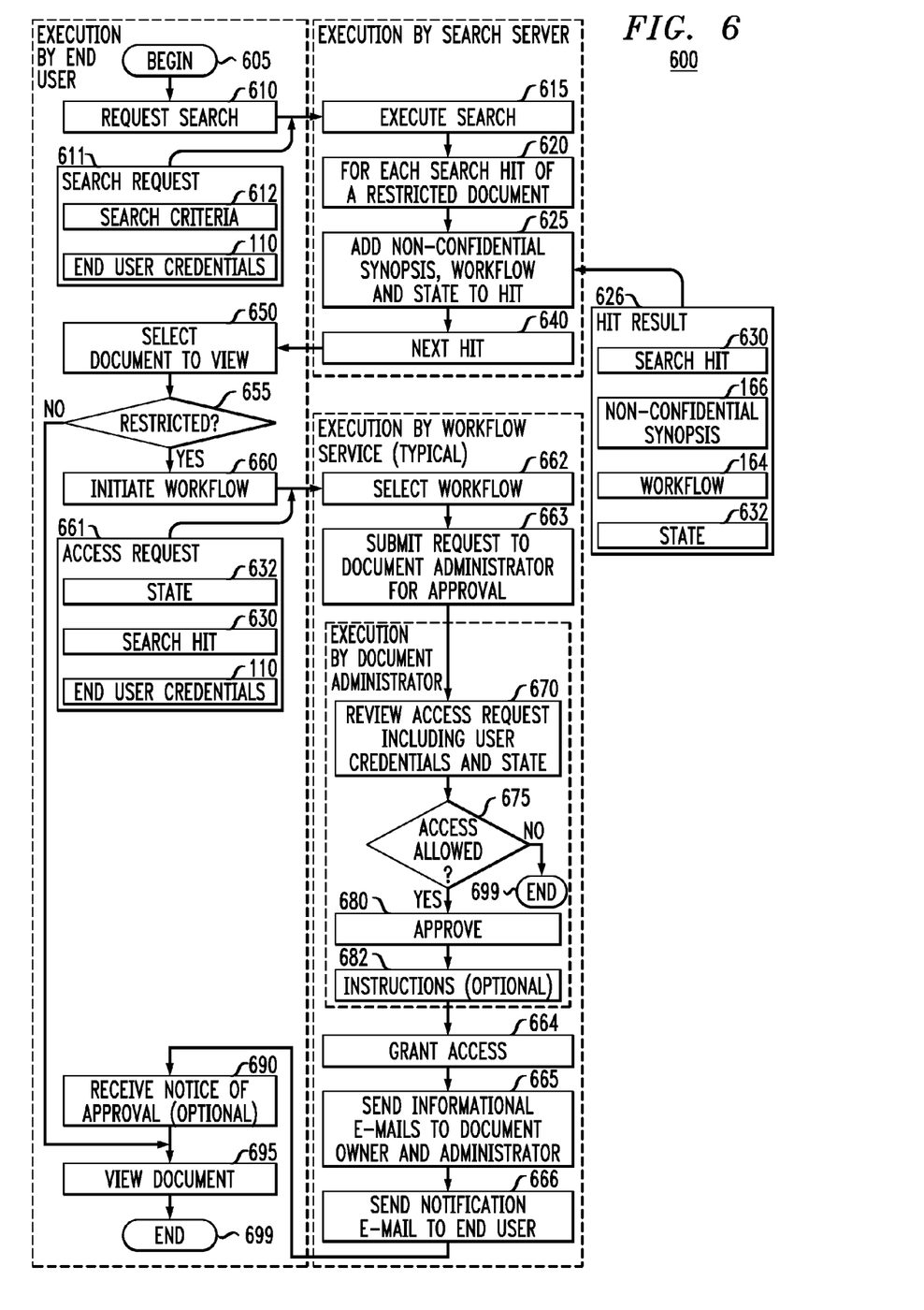
FIG. 6 is a flow diagram illustrating a methodology for providing at least one user access to one or more documents in a collaborative computing environment in accordance with a search engine, according to an embodiment of the present invention.

Referring now to FIG. 6, a flow diagram illustrates a methodology for providing at least one user access to one or more documents in a collaborative computing environment in accordance with a search engine, according to an embodiment of the present invention. Process 600 shows the steps to gain real-time access control through enterprise search. The process begins at 605 when an end user requests a search 610 through an end user terminal. In a preferred embodiment, this search is made through a web interface. In alternate embodiments, the search can be initiated through a cell phone, set-top box, instant message communications system, or some other graphical-user-interface (GUI). The search request 611 includes a search criteria 612 and user credentials 110. In an illustrative embodiment, the search criteria is in the form of concepts and words. Such search requests are well-known in the art.

An enterprise search service receives the search request and executes the search 615. The enterprise search service identifies zero or more documents which match the search criteria given in the search request. These results are known as "search hits" 630. The enterprise search service partitions the search hits into three groups 620: (i) documents in which the user is allowed to view because the user is included in the access control list; (ii) documents in which the user is not allowed to view, wherein these hits are discarded from the search results and are typically not presented to the user; and (iii) documents where the end user could potentially obtain access by executing a workflow. Each search hit within the third group, is annotated 625 with an optional non-confidential synopsis and a reference to an associated workflow. The search hit is further annotated with state information 632 which contains the search criteria presented during the search request. All this information is stored within a hit result data structure 626. In an alternate embodiment, the state information also includes prior search history (e.g., previously executed search criteria and/or search hits). In an additional alternate embodiment, the enterprise search index is encoded to allow fast retrieval, categorization, and filtering such that the steps of categorization and annotation (620, 625, 630) are performed in-line with the search execution 615.

The search hits and hit results are then transmitted to the end user terminal and presented to the end user 650. In a preferred embodiment, the search hits are displayed within a webpage. The webpage displays a short synopsis or text surrounding a hit within a matching document, as well as the name, size, and format of the document. Furthermore, hyperlinks or other user interface controls are provided for retrieval of the document.

The end user reviews the search results and follows one of the hyperlinks in the search results. If the document is restricted the system initiates a workflow 660. This may involve a workflow service where the service obtains access request information and selects a workflow 662. In a preferred embodiment, the access request data structure includes the state, search hit, and end user credentials or information. The selected workflow then triggers a request to the document administrator for access to the restricted document 663. In a preferred embodiment, the workflow transmits the access request information to a document administrator terminal. In an alternate embodiment, the workflow is executed in the web browser of the end user terminal using a scripting language such as JavaScript. In an additional embodiment, all or part of the workflow is executed by the enterprise search service through a J2EE web application.

The administrator reviews the request for access 670, which may include state information and end user credential information, and decides whether or not to grant access to the requested search hit document 675. In a preferred embodiment, the document administrator takes into consideration the job position of the user. For example, if the end user is requesting a sales document and has a sufficiently senior position within the sales department, then access may be granted. At this point, the document administrator may initiate further workflows or consult with other individuals or databases as necessary.

If the document administrator decides not to grant access, the process ends 699. If the document administrator approves access 680, the workflow service is notified to grant access 664 and the user credentials and/or access controls of the document or document collection are updated. In a preferred embodiment, the document administrator may grant access to the entire document collection, or a portion of it, so as to anticipate future requests by the end user for access to other documents within the collection. Further, in an additional embodiment, the document administrator may, optionally, accompany the approval with specific instructions 682. These instructions may include blocking or unblocking portions of particular documents (e.g., sensitive text), in effect limiting or expanding user access to sensitive documents. Also, in an alternate embodiment, the instruction may set time limits to grants of access to prevent unlimited access to sensitive documents. In a preferred embodiment, the affected access control fields of the search index are also updated. Depending on the implementation of the enterprise search service, this may not be practical in real-time and this updating is optional.

In an alternate embodiment, the function of the document administrator is automated and any or all requests are processed through an administrator service rather than by an individual. Further, there may be a team of document administrators who receive requests through a common queue or through other distribution means (e.g. database, instant messaging group or shared e-mail account).

After access has been granted, notifications are sent to document owners and administrators 665. Further, the end user is notified of the grant of access 666. Typical means of notification are through e-mail, instant messaging, or fax. Further, the steps of notification and granting of access may be performed in parallel. In an optional step, the user may be required to receive a notice of approval before viewing the document 690. This is an extra security measure to prevent unlawful access to documents and can be implemented by using a token, an authentication certificate, or cookie. The token, certificate, or cookie may be attached to the user notification and the user presents the token, certificate, or cookie at the time of viewing the document of interest. If this step is omitted, execution continues to 695.

After the notification process, the document retrieval service wilt now permit the end user to retrieve the document since the user now has the appropriate credentials 695. In an alternate embodiment, after obtaining access, the user can re-execute the search request and view the document of interest without restrictions.

Figure 7A:
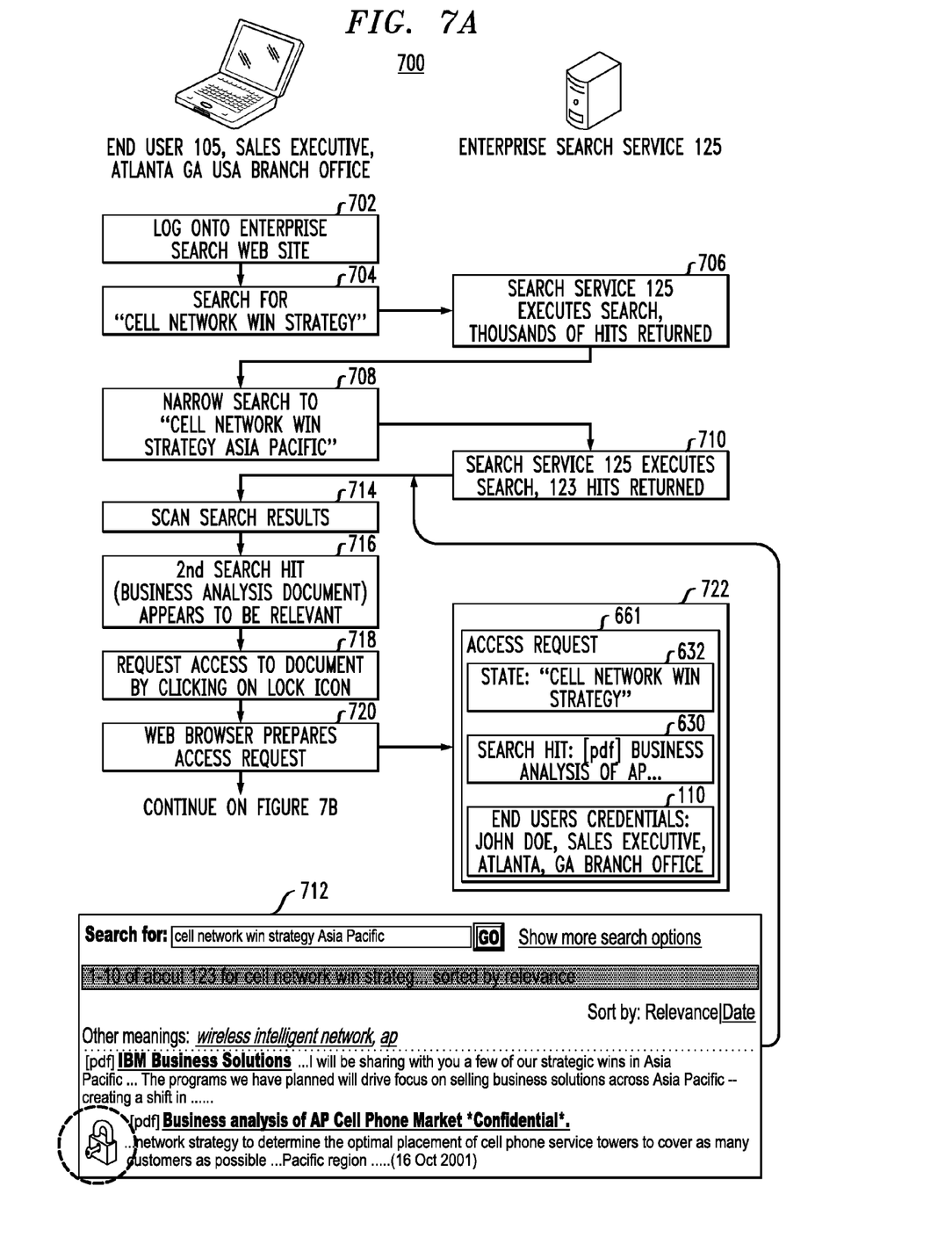
FIGS. 7A and 7B are a flow diagram illustrating the methodology of FIG. 6 as applied to a given example, according to an embodiment of the present invention.
Figure 7B:
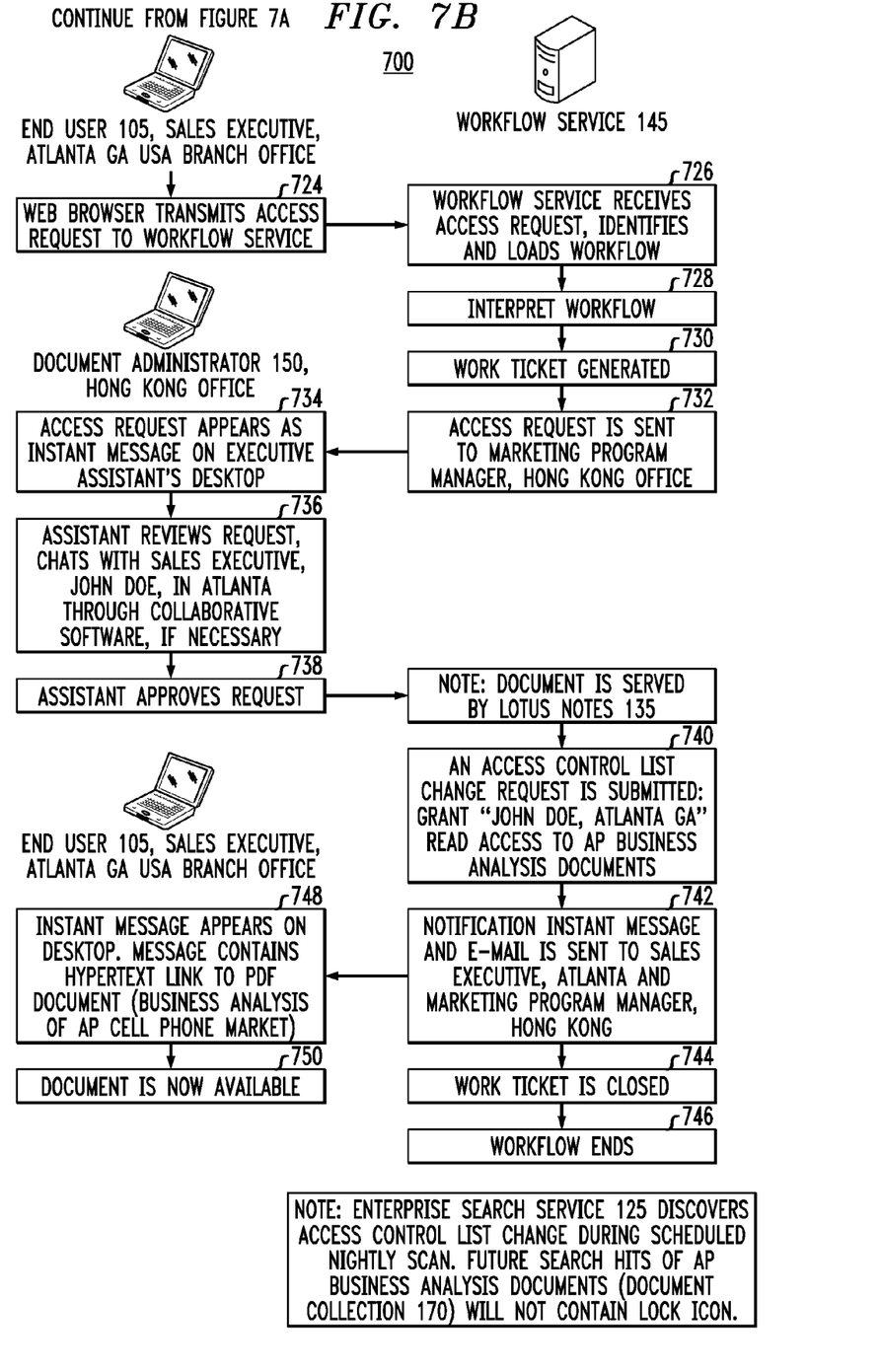

Referring now to FIGS. 7A and 7B, a flow diagram illustrates the methodology of FIG. 6 as applied to a given example, according to an embodiment of the present invention. By way of example and without loss of generality, block 700 illustrates one embodiment of the present invention. Assume that a sales executive in Atlanta, Ga. is researching "Win Strategies" in the telecommunications sector. The sales executive is looking for the best practices and ideas which will help him win more business deals. The sales executive first logs on to an enterprise search website 702 using his personal computer or end user terminal 105. The sales executive first issues a very general search, "cell network win strategy" 704. The enterprise search service 125 returns too many hits 706. The sales executive then issues a more focused search, "cell network win strategy Asia Pacific" 704. The search service executes the search and returns a more manageable number of hits 710.

The search results are presented to the sales executive on his web browser 712 in an easy to read format. The sales executive scans the search results 714 by reading the descriptions of the documents which are displayed with the search results. The sales executive finds a business analysis document that seems to be relevant 716. Unfortunately, this document contains confidential information and is not generally available to employees. The confidential document is labeled with a "lock" icon which means that the document is not directly accessible, but could potentially be accessible if the link were followed. The sales executive simply requests access to view the document by clicking on the icon 718. If using a conventional search system, the sales executive would have to fend for himself and figure out how to get access to the document on his own. Without the lock icon, the sales executive would not know how to request access because he does not know where the document is or who can grant access. Typically, a user would have to resort to backtracking with the URL, issuing other searches to box around the document, or network with peers (e.g., telephone, instant messaging, or through e-mail). In this example, the sales executive clicks on the icon and the system collectively knows that this particular business analysis document is under the control of the Marketing Program Manager's office in Hong Kong. Furthermore, the Hong Kong office has put a workflow in place for granting access to this document.

After clicking on the icon, the web browser prepares the access request 720. This process includes creating an information packet of end user credentials, state information, and search hit information 722.

Referring now to FIG. 7B, the web browser then transmits the access request to a workflow service 724. In this example, the sales executive's search query, name, job position and department, along with the name of the document he is requesting is forwarded to a workflow server. The workflow service takes the forwarded information and loads a workflow 726. The workflow is interpreted 728 and a work ticket is generated 730. The workflow locates and forwards the request information to a marketing program manager in the Hong Kong office 732. As a result, an access request message then appears on the desktop of an executive assistant in Hong Kong 734. This assistant either approves the request immediately or gathers additional information from the sales executive using collaborative software 736.

Once the assistant approves the request 738, the workflow continues and a change-request is created to grant the sales executive read access to all business analysis documents maintained by the Hong Kong marketing office 742. The workflow service then notifies the sales executive via e-mail or instant message 742. The workflow also sends various administrative e-mails, opens and closes work tickets as appropriate 744, and ends the workflow 746. Creation and processing of the change-request causes the access control lists 172 of all relevant documents to be updated so that the sales executive is permitted read access. This update, in turn, causes the Enterprise Search Service to update its indices 160 so that if the sales executive makes any future searches, the sales executive will no longer see lock icons next to any hits that reference the Hong Kong business analysis documents collection 750.

The notification to the sales executive includes a hypertext link to the business analysis document which allows the sales executive to open and view the business analysis PDF 748.

Figure 8:
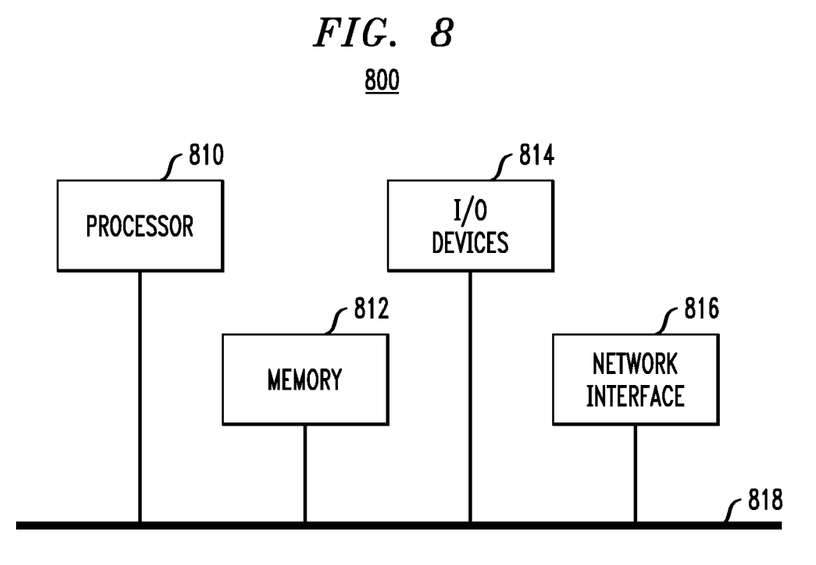
FIG. 8 is a diagram illustrating an illustrative hardware implementation of a computing system in accordance with which one or more components/methodologies of the present invention may be implemented, according to an embodiment of the present invention.

Referring now to FIG. 8, block diagram 800 illustrates an exemplary hardware implementation of a computing system in accordance with which one or more components/methodologies of the invention (e.g., components/methodologies described in the context of FIGS. 1-7B) may be implemented, according to an embodiment of the present invention.

As shown, the techniques for providing at least one user access to one or more documents in a collaborative computing environment in accordance with a search engine may be implemented in accordance with a processor 810, a memory 812, I/O devices 814, and a network interface 816, coupled via a computer bus 818 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-based method of providing at least one user access to one or more documents in a collaborative computing environment in accordance with a search engine, comprising the steps of:

presenting the user with search results, wherein the search results comprise at least one document comprising at least one portion to which the user has no access;

receiving a request from the user for access to the at least one document;

notifying a supervising entity of the user request to access the at least one document;

receiving an instruction from the supervising entity with regard to the request; and granting access to the user to the at least one document in accordance with the received instruction;

wherein the step of presenting the user with search results further comprises the step of allowing the user to view at least one segment to which the user has access, of the at least one document;

wherein the at least one document is associated with an access control list, the access control list:

specifying a first set of necessary credentials for at least one of read access and write access for the at least one document; and specifying a second set of necessary credentials for searching within the at least one document;

wherein the step of presenting the user with search results further comprises:

the step of searching for the at least one document according to at least one of concepts and words; and partitioning search hits into documents in which the user is allowed to view, documents in which the user is not allowed to view, and documents where the user could potentially obtain access by executing a workflow; and wherein the searching for the at least one document is limited to selective portions of the one or more documents based on a prior determination of search access within the one or more documents.

2. The method of claim 1, wherein the collaborative computing environment is a multi-user communications system.

3. The method of claim 1, wherein the one or more documents are stored in a virtual repository.

4. The method of claim 1, wherein the step of presenting the user with search results further comprises the step of selecting which of the one or more documents the user can preview, wherein the step of selecting is in accordance with at least one of the identity of the user, a policy of the collaborative computing environment, and the access control list.

5. The method of claim 1, wherein the step of notifying further comprises the step of forwarding user information.

6. The method of claim 1, wherein the instruction from the supervising entity is to increase or decrease user access to one or more documents.

7. The method of claim 1, further comprising the step of tracking user access to the one or more documents, grants of access to the one or more documents, and levels of access to the one or more documents.

8. The method of claim 1, wherein the step of presenting the user with search results further comprises the step of selecting portions of the one or more documents which the user can preview, wherein the selection is performed in accordance with a policy of the collaborative computing environment.

9. The method of claim 1, wherein the prior determination of search access is based on a policy of the collaborative computing environment.

10. The method of claim 9, wherein the policy governs portions of the one or more documents that can be searched.

11. The method of claim 1, wherein the documents where the user could potentially obtain access are annotated with a non-confidential synopsis.

12. The method of claim 1, wherein the documents where the user could potentially obtain access include a reference to the workflow.

13. A computer-based method wherein a user obtains access to one or more documents in a collaborative computing environment using a search engine, comprising the steps of:
   searching for the one or more documents using the search engine, wherein the search engine provides search results comprising at least one document, the at least one document comprising at least one portion to which the user has no access;
   requesting access to the at least one document using the search engine, wherein the search engine notifies a supervising entity of the request; and
   receiving access to the at least one document in accordance with an instruction from the supervising entity;
   wherein the step of providing search results further comprises the step of allowing the user to view at least one segment to which the user has access, of the at least one document;
   wherein the at least one document is associated with an access control list, the access control list:
      specifying a first set of necessary credentials for at least one of read access and write access for the at least one document; and
      specifying a second set of necessary credentials for searching within the at least one document;
   wherein the searching for the one or more documents includes partitioning search hits into documents in which the user is allowed to view, documents in which the user is not allowed to view, and documents where the user could potentially obtain access by executing a workflow; and
   wherein the searching for the one or more documents is limited to selective portions of the one or more documents based on a prior determination of search access within the one or more documents.

14. The method of claim 13, wherein the search engine provides search results in accordance with at least one of the identity of the user, a policy of the collaborative system, and the access control list.

15. The method of claim 13, wherein the step of requesting access further comprises the step of forwarding user information.

16. The method of claim 13, wherein the instruction from the supervising entity is to increase or decrease user access to one or more documents.

17. A computer-based method wherein a supervising entity grants a user access to one or more documents in a collaborative computing environment using a search engine, comprising the steps of:
   indexing the one or more documents using the search engine, wherein at least one of the one or more documents comprises at least one portion to which the user has no access;
   instructing the search engine to allow the user to search for the one or more documents using the search engine, wherein the searching for the one or more documents includes partitioning search hits into documents in which the user is allowed to view, documents in which the user is not allowed to view, and documents where the user could potentially obtain access by executing a workflow, and is limited to selective portions of the one or more documents based on a prior determination of search access within the one or more documents;
   receiving notification from the search engine of a user request to access the at least one document; and
   instructing the search engine to provide the user with access to the at least one document designating a no-access portion;
   wherein the search engine allows the user to view at least one segment to which the user has access, of the at least one document; and
   wherein the at least one document is associated with an access control list, the access control list:
      specifying a first set of necessary credentials for at least one of read access and write access for the at least one document; and
      specifying a second set of necessary credentials for searching within the at least one document.

18. The method of claim 17, wherein the step of indexing the one or more documents is in accordance with at least one of concepts and words.

19. The method of claim 17, wherein the step of receiving notification further comprises the step of obtaining user information.

20. The method of claim 17, wherein the step of instructing further comprises the step of increasing user access to one or more documents by unblocking one or more segments of the one or more documents.

21. The method of claim 17, wherein the step of instructing further comprises the step of decreasing user access to one or more documents by blocking one or more segments of the one or more documents.

22. An apparatus for providing at least one user access to one or more documents in a collaborative computing environment in accordance with a search engine, the apparatus comprising:
   a memory; and at least one processor coupled to the memory and operative to: (i) present the user with search results, wherein the search results comprise at least one document comprising at least one portion to which the user has no access; (ii) receive a request from the user for access to the at least one document; (iii) notify a supervising entity of the user request to access the at least one document; (iv) receive an instruction from the supervising entity with regard to the request; and (iv) grant access to the user to the at least one document in accordance with the received instruction;

wherein the at least one processor coupled to the memory is further operative to allow the user to view at least one segment to which the user has access, of the at least one document;

wherein the at least one document is associated with an access control list, the access control list:
specifying a first set of necessary credentials for at least one of read access and write access for the at least one document; and
specifying a second set of necessary credentials for searching within the at least one document;

wherein the processor is further operative to allow the user to search for the at least one document;

wherein the searching for the at least one document includes partitioning search hits into documents in which the user is allowed to view, documents in which the user is not allowed to view, and documents where the user could potentially obtain access by executing a workflow; and wherein the searching for the at least one document is limited to selective portions of the one or more documents based on a prior determination of search access within the one or more documents.

23. The apparatus of claim 22, wherein the operation of presenting the user with search results, the processor is further operative to allow the user to view at least one segment to which the user has access, of the at least one document.

24. The apparatus of claim 22, wherein the operation of presenting the user with search results, the processor is further operative to select which of the one or more documents the user can preview, wherein the operation of selecting is in accordance with at least one of the identity of the user, a policy of the collaborative system, and the access control list.

25. The apparatus of claim 22, wherein the operation of notifying, the processor is further operative to forward user information.

26. The apparatus of claim 22, wherein the processor is further operative to track at least one of user access to the one or more documents, grants of access to the one or more documents, and levels of access to the one or more documents.

27. An article of manufacture for providing at least one user access to one or more documents in a collaborative computing environment in accordance with a search engine, the article comprising a non-transitory computer readable storage medium containing one or more computer programs, which when executed implement the steps of:
presenting the user with search results, wherein the search results comprise at least one document comprising at least one portion to which the user has no access;
receiving a request from the user for access to the at least one document;
notifying a supervising entity of the user request to access the at least one document;
receiving an instruction from the supervising entity with regard to the request; and
granting access to the user to the at least one document in accordance with the received instruction;
wherein the step of presenting the user with search results further comprises the step of allowing the user to view at least one segment to which the user has access, of the at least one document;
wherein the at least one document is associated with an access control list, the access control list:
specifying a first set of necessary credentials for at least one of read access and write access for the at least one document; and
specifying a second set of necessary credentials for searching within the at least one document;
wherein the step of presenting the user with search results further comprises the step of searching for the at least one document;
wherein the searching for the at least one document includes partitioning search hits into documents in which the user is allowed to view, documents in which the user is not allowed to view, and documents where the user could potentially obtain access by executing a workflow; and
wherein the searching for the at least one document is limited to selective portions of the one or more documents based on a prior determination of search access within the one or more documents.

28. A computer-based method of providing at least one user access to one or more documents in a collaborative computing environment in accordance with a search engine, comprising the steps of:
presenting the user with search results, wherein the search results comprise at least one document comprising at least one portion to which the user has no access;
receiving a request from the user for access to the at least one document; and responsive to the request;
notifying a supervising entity of the user request to access the at least one document;
receiving an instruction from the supervising entity with regard to the request; and
granting access to the user to the at least one document in accordance with the received instruction;
wherein the request receiving, notifying, instruction receiving, and access granting steps are executed via a plurality of workflows; and each of the plurality of workflows specifies a respective set of actions to be performed to provide at least one user access to the at least one document;
wherein the at least one document is associated with an access control list, the access control list:
specifying a first set of necessary credentials for at least one of read access and write access for the at least one document; and
specifying a second set of necessary credentials for searching within the at least one document;
wherein the step of presenting the user with search results further comprises the step of searching for the at least one document;
wherein the searching for the at least one document includes partitioning search hits into documents in which the user is allowed to view, documents in which the user is not allowed to view, and documents where the user could potentially obtain access by executing a workflow; and
wherein the searching for the at least one document is limited to selective portions of the one or more documents based on a prior determination of search access within the one or more documents.

29. The method of claim 28, wherein a set of actions specified by a given one of the plurality of workflows comprises:
- composing a message containing text of a search query input by the user, a name of the requested document and credentials of the end user;
- sending the message as an instant message to the supervising entity;
- receiving instructions and approval from the supervising entity; and
- amending the credentials of the user to permit access to the at least one document.

\* \* \* \* \*